(12) United States Patent
Steinman

(10) Patent No.: US 9,527,269 B1
(45) Date of Patent: Dec. 27, 2016

(54) ACCELERATED BIODEGRADATION OF GARBAGE BAG CONTENTS

(71) Applicant: Gary David Steinman, Jerusalem (IL)

(72) Inventor: Gary David Steinman, Jerusalem (IL)

( * ) Notice: Subject to any disclaimer, the term of this patent is extended or adjusted under 35 U.S.C. 154(b) by 0 days.

(21) Appl. No.: 15/330,037

(22) Filed: Jul. 29, 2016

Related U.S. Application Data

(63) Continuation-in-part of application No. 14/619,400, filed on Feb. 11, 2015, now abandoned.

(51) Int. Cl.

| | | |
|---|---|---|
| *B65D 63/10* | (2006.01) | |
| *B65D 63/14* | (2006.01) | |
| *B65D 77/18* | (2006.01) | |
| *B29C 65/50* | (2006.01) | |
| *B32B 37/12* | (2006.01) | |
| *B32B 38/04* | (2006.01) | |
| *B32B 37/14* | (2006.01) | |

(52) U.S. Cl.
CPC ............... *B32B 37/12* (2013.01); *B32B 37/14* (2013.01)

(58) Field of Classification Search
USPC ..... 156/247, 249, 250, 267; 24/16 PB, 16 R, 24/30.5 T
See application file for complete search history.

(56) References Cited

U.S. PATENT DOCUMENTS

| | | | | |
|---|---|---|---|---|
| 5,503,883 A | * | 4/1996 | Kell, Jr. | .................... A01G 5/04 264/DIG. 67 |
| 8,878,084 B2 | * | 11/2014 | Urakami | ................ H01C 10/36 200/239 |
| 2006/0281839 A1 | * | 12/2006 | Barthel | ..................... B65B 9/04 524/100 |
| 2007/0184239 A1 | * | 8/2007 | Mallory | .................. B32B 29/02 428/99 |
| 2009/0183428 A1 | * | 7/2009 | Agullo | .................... A01G 9/128 47/44 |
| 2010/0212117 A1 | * | 8/2010 | Haase | ................ B65D 63/1027 24/16 PB |
| 2012/0163736 A1 | * | 6/2012 | Gaddis | .................. B65F 1/0006 383/1 |
| 2014/0030536 A1 | * | 1/2014 | Krishnaswamy | ....... B32B 27/36 428/483 |

* cited by examiner

*Primary Examiner* — Sing P Chan

(57) ABSTRACT

To aid in the spontaneous opening of closed garbage bags deposited in landfills, a biodegradable bag tie made from plant sources is described. The preparation of the tie material includes hydrolysis with an acidic, enzymatic, or basic aqueous solution, combined with microwave exposure, to make the strip amenable to rapid digestion by microorganisms indigenous to landfill environments. The strips may then be tied by knotting around the open end of the polyethylene garbage bag or by joining the two ends of the strip with double-sided adhesive tape. In this way, the closed tie is digested soon after deposition of the bag in a landfill, thereby also exposing its contents to local aerobic bacteria and fungi.

1 Claim, No Drawings

ACCELERATED BIODEGRADATION OF GARBAGE BAG CONTENTS

CROSS-REFERENCES TO RELATED APPLICATIONS

This application is a continuation-in-part of U.S. application Ser. No. 14/619,400 filed on Feb. 11, 2015

BACKGROUND OF THE INVENTION

Field of the Invention

The present inexpensive invention concerns a pretreated tie device isolated from botanic sources for accelerating the exposure of the inner contents of sealed polyethylene rubbish bags to promote aerobic biodegradation by the native microflora within the natural environment of a common landfill, thereby augmenting the rate of decomposition of such deposited waste mass.

Description of Related Art

Much confusion in the scientific and governmental literature has resulted from the broad, indefinite meaning of the term "biodegradable." Containers, such a rubbish bags, have been defined as biodegradable whether they are decomposed by fungi and bacteria completely to basic end-products such as carbon dioxide, water, and methane, or to mixtures containing small fragments of polyethylene along with these basic end-products. Such containers may initially be composed of polysaccharides or various combinations of degradable sugars and synthetic organic polymers. These formulations commonly result in more costly and less strong container bags.

Currently, garbage is commonly disposed of in polyethylene rubbish bags sealed with plastic ties which may take several hundred years to degrade by natural means because of the barrier of the degradable contents to landfill microflora created by the bag wall, thereby preventing timely reduction of the landfill mass. As will be noted below, the present bag tie invention involves a pretreated material from natural plant sources which is subject to greatly accelerated decomposition, thereby promoting bag opening and contact exposure of its contents in a common landfill microfloral environment.

US Patent Application 2007/0184239 (Mallory) describes a more complicated web netting to contain yard waste, employing jute twine or paper in its structure. Such an arrangement limits disposal to a composting facility rather than a landfill. In contradistinction, steps are taken in the present invention to enhance the rate of breakdown of natural materials to meet the objectives of the device. Experiments by this inventor have demonstrated that pretreated ties wrapped around a plastic bag and buried in soil typically reach a separation point in about 6 weeks, whereas paper degrades much more slowly. A delay in breakdown would result in deeper deposit loci since the normal processing of landfill sites is to continuously add more layers of soil on sequential deposition of refuse. This would make the garbage bags less exposed to upper layers of deposit, which have higher oxygen contents, than in deeper deposits. The present invention makes special efforts to treat the tie material in order to result in accelerated decomposition, with earlier bag opening following deposition.

US Patent Application 2012/0163736 (caddis, et al) describes a large bag for disposing of trees. Typically, such container products are less strong and more costly than polyethylene bags. U.S. Pat. No. 5,503,883 (1996; Kell, et al.) reports a complex framework of a multilayer paper laminate ring for containing wreaths. Paper is a product made from natural materials but which takes much longer to biodegrade than the pretreated ties described in the present disclosure. The water-soluble packaging in US Patent Application 2006/0281839 (Barthel, et al.) would suffer from decomposition during storage and transport of biomass to a landfill site. The device described in U.S. Pat. No. 8,878,084 (Urakami, et al.) would have little application in the present tie formulation because of cost and complexity.

A device for holding plants on a wire is mentioned in US Patent Application 2009/0183428 (Agullo, et al.). Its application in rubbish disposal is unclear. The closure reported in US Patent Application 2010/0212117 (Haase) describes a compostable tie but is made from a polymeric resin, unlike the natural biological sources in the present application. Its production would be more complicated than the tie described presently and would defeat the goal of keeping costs low. The multilayer gas barrier reported in US Patent Application 2014/0030536 (Krishnaswamy, et al) is made from a polyhydroxyalkanoate polymer blend, rather than directly from a natural material.

BRIEF SUMMARY OF THE INVENTION

Presently, municipal and commercial biodegradable garbage is typically discarded in sealed plastic bags. The present bag tie invention defines a simple, inexpensive, pretreated tie device made from natural plant components designed to expose the garbage contents of rubbish bags to the degradative microflora of a landfill environment more quickly following deposition. Reducing decomposition time in this natural way would reduce overhead cost and "green house" gas production, and enhance renewable space for waste disposal in a landfill.

DETAILED DESCRIPTION OF THE INVENTION

With rapidly expanding landfill sites and the threat of environmental contamination from overflow and seepage, ways to enhance the natural degradation of deposited refuse must be sought. Under present conditions in most places, deposits in landfills may last many years, if not decades and centuries. One of the culprits is the increasing use of sealed polyethylene bags to retain domestic and food service wastes until such time as they may be collected and deposited in local landfills or shipped to distant sites. The problem with this approach is that such bag polymers themselves degrade very slowly, so that the limiting size of the dump site is reached in relatively short periods of time and new locales must be found, thereby reducing nearby land available for habitation. If the contents of such bags are isolated by the plastic walls of the container from the ecological environment, including biodegrading bacteria and fungi, the rate of decomposition of the waste is markedly slowed. Such microorganisms could have been part of the initial bag contents or could have entered from the natural environment of the landfill once the refuse contents are exposed to the ecosystem.

Bags that are totally biodegradable, commonly made from modified carbohydrates, are available commercially. However, they suffer from several limitations, including high cost, small volume, weak sidewalls, and disposal limited to heavily controlled composite sites.

The present invention describes a means for producing and providing a tie device for exposing the inner contents of common polymeric rubbish bags to accelerated biodegradation within the natural environment, thereby enhancing the reduction of deposited biomass. If the contents are shielded from the environment for an extended period of time, slow aneraobic metabolic degradation, which produces organic acids and methane (a significant air pollutant), would be favored. The absence of a sufficient oxygen supply to the contents of the enclosed garbage, typically closed with a plastic strip tie, can essentially halt any ongoing aerobic biodegradation that may have been possible at the time of or soon after refuse deposit in the landfill. If the bag contents could be exposed to the ambient air and environmental organisms more quickly, aerobic metabolism would be favored, resulting in the production of water and carbon dioxide instead.

Typically, aerobic metabolism proceeds much faster than anerobic pathways. Therefore, it is proposed that this bag tie device to be described here offers a simple, inexpensive means for exposing the bag contents more quickly to the landfill environment (soon after deposition) at low added cost and input of effort. While the polyethylene bag itself and any metallic/glass/plastic contents would remain, the majority of the biodegradable contents, especially food and yard trimmings, would expeditiously diminish in size as the enhanced breakdown process proceeded.

What will be described in more detail here is a means for opening naturally the sealed refuse bag soon after deposition in a landfill. Whereas the bag itself can continue to be produced commercially from polythene or similar film in this model, the tie closing it tightly at its usual upper opening can be made from natural plant materials, especially those that are discarded because of otherwise inadequate usefulness for humans. Such botanics can be the object of in situ biodegradation as well. In analyzing the decaying contents of landfills, materials which are most subject to biodegradation include food stuffs and yard waste such as grass shavings, leaves, and bush trimmings. Contributing to the bioactivity via this device is the fact that the composition of naturally occurring botanical materials such as lettuce leaves and celery can include up to 94% water, a component needed to expedite the enzyme activities of the microorganisms.

More particularly, raw materials for use in the novel bag tie closure described in the present disclosure might include normally discarded natural plant products and by collecting these natural plant products that might serve as a biodegradable refuse bag closure, including fronds, husks, and leaves of such sources as corn, lemon grass, palm, cabbage, rice, coconut, lettuce, artichoke, aloe, cactus, or bamboo. For use in the here-described manner, the irregularly shaped starting material for the tie would be cut into more manageable strips such as 1-3 inches wide by 7-14 inches long.

To aid in the utility of the so-created strips, they would initially be subjected to pretreatment such as limited hydrolysis and disruption of their underlying intertwined lignin/cellulose support structure using various combinations of aqueous acidic or basic chemical solutions, enzymes, and microwave devices. These pretreatments include incubation at 80 degrees centigrade for 15-60 minutes in a dilute aqueous solution of an alkali comprising sodium hydroxide, ammonia, or sodium acetate or a dilute aqueous acidic solution comprising sulfuric acid, acetic acid, hydrochloric acid or trifluoroacetic acid; or incubating for 1-8 hours at 37 degrees centigrade in a dilute aqueous solution of cellulase, cellobiohydrolase, endoglucanase, xylanase, pectinase, cellobiase, or hemicellulase; or, alternatively, incubating in a dilute aqueous suspension of glycolytic fungi or bacteria for 5-90 minutes at 23-27 degrees centigrade. Another treatment technique is exposure of the tie material to microwave radiation in water for 5-30 minutes at 50-500 watts following the previous chemical or enzymatic step, or combined with the chemical or enzymatic step above without heating, to provide the treated tie material.

After washing with water, impregnating the pretreated tie material with inorganic peroxide by lightly spraying a 0.01-0.1% aqueous solution of strontium peroxide, calcium peroxide, magnesium peroxide, barium peroxide with sodium chlorate, hydrogen peroxide combined with an ester of pyrocarbonic acid or an N-vinyl heterocylic, lithium peroxide, sodium peroxide, sodium peroxyborate monohydrate, or sodium carbonate peroxyhydrate, and then air-drying for 12 hours at 23-27 degrees centigrade. This chemical component would act to supply oxygen locally once the tie-bearing bags would be placed in the landfill. The inorganic peroxides typically are stable at room temperature but break down to release oxygen in elevated temperature environments, such as being buried within a landfill.

The bag ties are provided with an adhesive end by applying a 2-3 inch long strip of double-sided adhesive tape to one end of the pretreated strips and retaining a release tape backing. The double-sided adhesive tape can have a single or two release tape backing, and if the adhesive has two release tape backing, one is removed to expose a single adhesive side to apply the adhesive to an end portion of the pretreated strips. An additional elective aid to accelerating metabolic degradation might be to mix sand with the covering soil, thereby enhancing its porosity to water and air.

The advantages of such an innovative bag tie would be:
1) Low cost
2) Ease of storage before use
3) Diminished accumulated size of active landfills
4) Greatly accelerated biodegradation
5) Reduced release of explosive, environmentally unfriendly methane
6) Simple use in a format commonly known to the consumer public (bag+tie closure)
7) No major change in bag production methods The following is a typical example of the steps in preparing and using these biodegradable bag ties. It should be clear to anyone knowledgable in the art that variations of concentrations and strip dimensions as well as raw material sources could be employed to achieve similar results:

Preferred Pretreatment and Application of the Tie Device

Corn husks are cut into strips 1 inch by 8 inches. The ties are submerged in a 3% (w/v) aqueous solution of sodium hydroxide, which is then placed in a standard microwave oven. Together they are exposed to 250 watts for 10 minutes. The strips are then washed by dipping in plain water until neutral, followed by spraying them lightly with 0.05% (w/v) magnesium peroxide aqueous solution until slightly moist. This is followed by air-drying at 25 degrees centigrade for 12 hours and then stored.

At the time of use, a tie strip is placed around a polyethylene garbage bag circumferentially near the open top and is tightened in place by a double knot made with the two ends of the tie strip or by double-sided tape of 2 inches in length applied to one end of the tie and pressed against the other end so that they adhere together.

What is claimed is:
1. A novel process for preparing special refuse biodegradable bag ties comprising
a) collecting natural plant products for said biodegradable bag ties comprising fronds, husks, and leaves of corn, lemon grass, palm, cabbage, rice, coconut, lettuce, artichoke, aloe, cactus, or bamboo, and cutting said natural plant products into plant strips of, 1-3 inches wide by 7-14 inches long;

b) pretreating said plant strips by incubation at 80 degrees centigrade for 15-60 minutes in a dilute aqueous alkali solution comprising sodium hydroxide, ammonia, or sodium acetate or a dilute aqueous acidic solution comprising sulfuric acid, acetic acid, hydrochloric acid or trifluoroacetic acid, or a dilute aqueous solution of cellulase, cellobiohydrolase, endoglucanase, xylanase, pectinase, cellobiase, or hemicellulase at 37 degrees centigrade, or a dilute aqueous suspension of glycolytic fungi or bacteria for 5-90 minutes at 23-27 degrees centigrade to provide pretreated plant strips;

c) treating said pretreated plant strips with microwave radiation in water for 5-30 minutes at 50-500 watts following the previous chemical or enzymatic step, or combined with step 1b above without heating to form tie materials;

d) impregnating, said tie material with inorganic peroxide by lightly spraying a 0.01-0.1% aqueous solution of strontium peroxide, calcium peroxide, magnesium peroxide, barium peroxide with sodium chlorate, hydrogen peroxide combined with an ester of pyrocarbonic acid or an N-vinyl heterocylic, lithium peroxide, sodium peroxide, sodium peroxyborate monohydrate, or sodium carbonate peroxyhydrate, and air-dying for 12 hours at 23-27 degrees centigrade;

e) applying a 2-3 inch long strip of double-side adhesive tape to an end portion of said tie materials, and retaining a release tape backing to form said biodegradable bag ties.

\* \* \* \* \*